United States Patent Office 3,096,300
Patented July 2, 1963

3,096,300
POLYMERIC COMPOSITIONS OF MONOVINYL AROMATIC HYDROCARBONS AND SYNTHETIC RUBBER CONTAINING HIGH MOLECULAR WEIGHT POLYETHYLENE GLYCOLS OR MONO-ESTERS OF SUCH GLYCOLS
William E. Rittenhouse, Norwich, Conn., and Roger L. Briggs and Raymond M. Price, Midland, Mich., assignors to The Dow Chemical Company, Midland, Mich., a corporation of Delaware
No Drawing. Filed July 10, 1958, Ser. No. 747,603
7 Claims. (Cl. 260—31.4)

This invention concerns compositions of matter comprising a predominant amount of a normally solid thermoplastic polymer consisting of one or more polymerized monovinyl aromatic hydrocarbons intimately incorporated with a minor proportion of a synthetic rubbery copolymer of butadiene and styrene and a small proportion of at least one polyethylene glycol of high molecular weight or a fatty acid monoester of such glycol.

U.S. Patent No. 2,588,660 describes compositions which are thermoplastic monovinyl aromatic resins containing from 5 to 10 percent by weight of a polyethylene glycol having a molecular weight between 200 and 1200 which compositions have a nacreous appearance and possess improved impact strength and elongation values over unmodified vinyl aromatic resins. The patent teaches that employing the polyalkylene glycol in amounts exceeding the solubility of the polyalkylene glycol in the solid resin results in compositions that can be molded by usual injection molding operations to form articles having a nacreous or mother of pearl appearance, together with good elongation and impact strength.

Our researches have shown that improvement in the elongation value of compositions of vinyl aromatic polymers and polyethylene glycols is dependent in part upon the molecular weight distribution of the polymer and the molecular weight and amount of the polyethylene glycol incorporated therewith.

It is a primary object of the invention to provide new polymeric compositions of matter comprising a normally solid thermoplastic polymer consisting of a predominant amount of at least one polymerized monovinyl aromatic hydrocarbon of the benzene series intimately incorporated with a minor amount of a rubbery copolymer of butadiene and styrene and a small amount, e.g., from 1 to 5 percent by weight, based on the total weight of the polymeric ingredients, of at least one polyethylene glycol of high molecular weight or a fatty acid monoester of such glycol. Another object is to provide such compositions having improvement in one or more of the properties elongation, tensile strength, impact strength and heat distortion temperature. Other and related objects may appear from the following description of the invention.

According to the invention it has been found that polymeric compositions of matter having improvement in one or more of the properties impact strength or percent elongation with little or no change in heat distortion temperature can readily be obtained by intimately incorporating with one another from 85 to 97 percent by weight of a normally solid thermoplastic polymer consisting of at least one polymerized monovinyl aromatic hydrocarbon of the benzene series, i.e., an aromatic hydrocarbon having a single benzene nucleus and a single vinyl radical directly attached to the benzene nucleus, and from 3 to 15 percent of a rubbery copolymer containing in chemically combined form from 70 to 85 percent by weight of butadiene and from 30 to 15 percent of styrene, together with from 1 to 5 percent by weight, based on the weight of the polymeric ingredients, of at least one compound selected from the group consisting of polyethylene glycols having an average molecular weight between 4000 to 6000 and monostearates and monooleates of such polyethylene glycols.

It is important that the polyethylene glycols employed have an average molecular weight of from 4000 to 6000 and that the monostearate and monooleate esters are derivatives thereof in order to obtain compositions having improved impact strength and percent elongation values. Such polyethylene glycols and mono-esters thereof are insoluble or substantially insoluble in the solid vinyl aromatic polymer at ordinary temperatures and result in compositions having high heat distortion temperature and improved impact strength.

Polystyrene is the preferred vinyl aromatic polymer, but polymers and copolymers of any one or more monovinyl aromatic hydrocarbons of the benzene series can be used. Suitable polymers are the normally solid thermoplastic resinous products obtained by polymerizing alone or in admixture with one another a monovinyl aromatic hydrocarbon such as styrene, vinyltoluene, vinylxylene, ethylvinylbenzene, isopropylstyrene, tert.-butylstyrene, ethylvinyltoluene and the like. Polymerization of the monovinyl aromatic hydrocarbons can be carried out in usual ways such as by heating the monomer in bulk, in aqueous suspension or in aqueous emulsion and in the presence or absence of a polymerization catalyst, e.g., benzoyl peroxide, hydrogen peroxide, cumene hydroperoxide, di-tert.-butylperoxide, tert.-butyl hydroperoxide, potassium persulfate, etc.

The rubbery copolymer to be employed in preparing the compositions can be a copolymer of from 70 to 85 percent by weight of butadiene and from 30 to 15 percent of styrene. The rubbery copolymers are usually prepared by polymerizing a mixture of the monomers in an aqueous emulsion in the presence of a polymerization catalyst and at temperatures between 0° and 100° C. The product is obtained in the form of a synthetic latex from which the copolymer is recovered in usual ways, e.g., by coagulating the latex separating, washing and drying the polymer or by spreading a thin layer of the latex on a heated roll, evaporating the water and recovering the dried latex solids.

The polyethylene glycols having an average molecular weight of from 4000 to 6000 and monoesters thereof such as polyethylene glycol monostearate and polyethylene glycol monooleate are known compounds and are available commercially.

The compositions of the invention can be prepared by intimately incorporating the polymeric ingredients with one another and with the polyethylene glycol or a monostearate or monooleate ester thereof in the aforesaid proportions to form a uniform composition. Blending of the ingredients into a homogeneous composition can readily be accomplished in usual ways such as by milling the heat-plastified mixture of materials on compounding rolls, in a Banbury mixer or a plastics extruder at temperatures between about 140° and 280° C. The compounding is preferably carried out in the absence of air or oxygen or with limited access of air to the heat-plastified materials to avoid deterioration or oxidation of the product.

Small amounts of additives such as pigments, dyes, coloring agents, lubricants, light stabilizers, antioxidants, mold release agents, plasticizers and the like can be added or mixed with the composition, but such additives are not required. When used, the additives are usually employed in amounts corresponding to from 1 to 10 percent by weight of the composition.

Alternatively, the rubber can be dissolved in the monomeric monovinyl aromatic hydrocarbon and the resulting solution or dispersion heated at temperatures between 80° and 220° C. to polymerize the monomer, or the rubbery copolymer and the polyethylene glycol or monstearate or monooleate can be dissolved or dispersed in the monomeric vinyl aromatic hydrocarbon and the mixture heated to polymerize the monomers. Such polymeric materials are preferably heat-plastified and mechanically worked, e.g. by compounding in a Banbury mixer or a plastics extruder, to obtain a final product having the polymeric ingredients and the polyethylene glycol or monoester thereof uniformly incorporated with one another.

The following examples illustrate ways in which the principle of the invention has been applied, but are not to be construed as limiting its scope.

EXAMPLE 1

In each of a series of experiments, a charge of 93 parts by weight of a batch of granular molding grade polystyrene having a viscosity characteristic of 24 centipoises as determined for a 10 weight percent solution of the polystyrene in toluene at 25° C. was heat-plastified in a Banbury mixer and compounded with 7 parts by weight of a batch of a copolymer of 70 percent by weight of butadiene and 30 percent of styrene at a temperature of 320° F. for a period of 6 minutes. Thereafter, a charge of a polyethylene glycol having an average molecular weight of 4000 was added in amount as stated in the following table. The resulting mixture was compounded at a temperature of 300° F. for a period of 7 minutes, then was removed from the mixer, allowed to cool and ground to a granular form. Portions of the composition were injection molded to form test pieces of 1/8 x 1/2 inch cross section by 4½ inches long. These test pieces were used to determine the tensile strength and percent elongation for the composition employing procedures similar to those described in ASTM D638–47T. Impact strength was determined by procedure similar to that described in ASTM D256–47T. Other molded test pieces were used to determine a heat distortion temperature for the composition by a procedure of Heirholzer and Boyer, see ASTM Bull. No. 134 of May 1945. Table I identifies the compositions and gives the proportions of the ingredients in parts by weight employed in making the same. The table also gives the properties determined for the composition. For purpose of comparison a composition was prepared without the polyethylene glycol of 4000 molecular weight and its properties determined in similar manner and are included in the table. In the table the expression "E–4000" is used to designate the polyethylene glycol having an average molecular weight of 4000, for brevity.

Table I

| | Starting materials | | | Product | | | |
|---|---|---|---|---|---|---|---|
| Run No. | Polystyrene, parts | Rubbery copolymer, parts | E-4000, parts | Tensile strength, lbs./sq. in. | Elongation, percent | Notched impact strength, ft.-lbs. | Heat distortion temp., °C. |
| 1 | 93 | 7 | 0 | 5,840 | 5.4 | 1.0 | 85 |
| 2 | 93 | 7 | 1.86 | 4,335 | 22.6 | 1.54 | 84 |
| 3 | 93 | 7 | 3.72 | 3,710 | 24.6 | 2.42 | 86 |

EXAMPLE 2

In each of a series of experiments, a composition was prepared and tested by procedures similar to those employed in Example 1, except using a polyethylene glycol having an average molecular weight of 6000. The products had the properties reported in Table II.

Table II

| | Starting materials | | | Product | | | |
|---|---|---|---|---|---|---|---|
| Run No. | Polystyrene, parts | Rubbery copolymer, parts | E-6000, parts | Tensile strength, lbs./sq. in. | Elongation, percent | Notched impact strength, ft.-lbs. | Heat distortion temp., °C. |
| 1 | 93 | 7 | 0 | 7,760 | 4.3 | 1.22 | 86 |
| 2 | 93 | 7 | 1 | 5,940 | 30.6 | 2.24 | 86.5 |
| 3 | 93 | 7 | 2 | 5,690 | 37.9 | 2.55 | 84 |
| 4 | 97 | 7 | 3 | 5,310 | 50.6 | 2.45 | 83.5 |
| 5 | 97 | 7 | 4 | 4,960 | 47.2 | 2.77 | 83.5 |
| 6 | 97 | 7 | 5 | 4,770 | 45.4 | 2.88 | 82.5 |

EXAMPLE 3

In each of a series of experiments, a composition was prepared and tested employing procedures similar to those employed in Example 1, except that polyethylene glycol monostearate, i.e. the monoester of stearic acid and polyethylene glycol having an average molecular weight of 4000, was substituted for the polyethylene glycol used in said example. The product had the properties reported in Table III.

Table III

| | Starting materials | | | Product | | | |
|---|---|---|---|---|---|---|---|
| Run No. | Polystyrene, parts | Rubbery copolymer, parts | Polyglycol monostearate, parts | Tensile strength, lbs./sq. in. | Elongation, percent | Notched impact strength, ft.-lbs. | Heat distortion temp., °C. |
| 1 | 93 | 7 | 0 | 5,840 | 5.4 | 1.0 | 85 |
| 2 | 93 | 7 | 1.86 | 4,240 | 20.0 | 1.5 | 83 |
| 3 | 93 | 7 | 3.72 | 3,505 | 29.9 | 2.5 | 82 |

EXAMPLE 4

Compositions similar to those prepared in Example 3 were made employing the monostearate of a polyethylene glycol having an average molecular weight of 6000. The products had the properties reported in Table IV.

Table IV

| | Starting materials | | | Product | | | |
|---|---|---|---|---|---|---|---|
| Run No. | Polystyrene, parts | Rubbery copolymer, parts | Polyglycol monostearate, parts | Tensile strength, lbs./sq. in. | Elongation, percent | Notched impact strength, ft.-lbs. | Heat distortion temp., °C. |
| 1 | 93 | 7 | 1.86 | 4,545 | 17.2 | 2.1 | 84 |
| 2 | 93 | 7 | 3.72 | 3,855 | 26.1 | 2.2 | 86 |

EXAMPLE 5

A charge of 1395 grams of a batch of polystyrene similar to that described in Example 1 was heat-plastified at a temperature of 320° F. in a Banbury mixer. Thereafter, a charge of 105 grams of a batch of a rubbery copolymer of 70 percent butadiene and 30 percent styrene similar to that described in Example 1, was added. The mixture was compounded for a period of 7 minutes. A charge of 45 grams of the monooleate ester of polyethylene glycol having an average molecular weight of 6000 was added. The resulting mixture was compounded at a temperature of 300° F. for a period of 6 minutes, then removed from the mixer, cooled and ground to a granular form. The product was molded to form test pieces and was tested employing procedures similar to those employed in Example 1. For purpose of comparison, a composition was prepared without the polyethylene glycol monooleate and was tested in similar manner. The compositions had the properties reported in Table V.

Table V

| Run No. | Starting materials | | | Product | | | |
|---|---|---|---|---|---|---|---|
| | Polystyrene, parts | Rubbery copolymer, parts | Polyglycol monooleate, parts | Tensile strength, lbs./sq. in. | Elongation, percent | Notched impact strength, ft.-lbs. | Heat distortion temp., °C. |
| 1 | 1,395 | 105 | 0 | 6,770 | 5.8 | 1.66 | 78 |
| 2 | 1,395 | 105 | 45 | 4,210 | 33.5 | 2.7 | 76 |

EXAMPLE 6

In each of a series of experiments, a composition was prepared and tested employing procedures similar to those employed in Example 1. The compositions consisted of 97 parts by weight of polystyrene, 3 parts of the copolymer of 70 percent by weight butadiene and 30 percent styrene and from 0 to 6 percent by weight, based on the total weight of the polymeric ingredients of a polyethylene glycol having an average molecular weight of 6000. The compositions had the properties reported in Table VI.

Table VI

| Run No. | Starting materials | | | Product | | | |
|---|---|---|---|---|---|---|---|
| | Polystyrene, parts | Rubbery copolymer, parts | E-6000, parts | Tensile strength, lbs./sq. in. | Elongation, percent | Notched impact strength, ft.-lbs. | Heat distortion temp., °C. |
| 1 | 97 | 3 | 0 | 7,730 | 3.8 | 1.07 | 86 |
| 2 | 97 | 3 | 1 | 6,560 | 10.3 | 1.09 | 91 |
| 3 | 97 | 3 | 2 | 5,950 | 31.4 | 1.12 | 91 |
| 4 | 97 | 3 | 3 | 5,540 | 29.4 | 1.62 | 87.5 |
| 5 | 97 | 3 | 4 | 5,100 | 31.7 | 1.92 | 85.5 |
| 6 | 97 | 3 | 5 | 5,020 | 33.9 | 1.38 | 84 |
| 7 | 97 | 3 | 6 | 4,800 | 18.2 | 1.08 | 83.5 |

As shown in the above table, the compositions of the invention containing from 1 to 5 percent of the polyethylene glycol possess improvement in elongation and impact strength.

EXAMPLE 7

In each of a series of experiments, a composition was prepared and tested employing procedures similar to those employed in Example 1. The compositions consisted of 85 parts by weight of polystyrene, 15 parts of the copolymer of 70 percent by weight of butadiene and 30 percent of styrene and from 0 to 6 percent by weight, based on the total weight of the polymeric ingredients of a polyethylene glycol having a molecular weight of 6000. The compositions had the properties reported in Table VII. For purpose of comparison, compositions outside the scope of the invention, i.e. runs Nos. 1 and 7, were prepared and tested and the results reported in the table.

Table VII

| Run No. | Starting materials | | | Product | | | |
|---|---|---|---|---|---|---|---|
| | Polystyrene, parts | Rubbery copolymer, parts | E-6000, parts | Tensile strength, lbs./sq. in. | Elongation, percent | Notched impact strength, ft.-lbs. | Heat distortion temp., °C. |
| 1 | 85 | 15 | 0 | 6,700 | 5.6 | 3.95 | 85.5 |
| 2 | 85 | 15 | 1 | 5,410 | 50.9 | 5.33 | 85 |
| 3 | 85 | 15 | 2 | 4,800 | 52.9 | 6.58 | 84 |
| 4 | 85 | 15 | 3 | 4,740 | 61.8 | 6.42 | 83.5 |
| 5 | 85 | 15 | 4 | 4,320 | 57.1 | 6.67 | ------ |
| 6 | 85 | 15 | 5 | 4,110 | 52.5 | 4.24 | 84 |
| 7 | 85 | 15 | 6 | 3,870 | 36.9 | 3.14 | 81.5 |

We claim:
1. A polymeric composition of matter comprising from 85 to 97 percent by weight of a normally solid thermoplastic polymer consisting of at least one polymerized monovinyl aromatic hydrocarbon having a single benzene nucleus and a single vinyl radical directly attached to a carbon atom of the benzene nucleus and from 15 to 3 percent by weight of a rubbery copolymer containing in chemically combined form from 70 to 85 percent by weight of butadiene and from 30 to 15 percent of styrene, intimately incorporated with one another and with from 1 to 5 percent by weight, based on the total weight of the polymeric ingredients, of a polyoxyalkylene compound selected from the group consisting of polyethylene glycols having an average molecular weight between 4000 and 6000 and the monoesters of stearic acid and oleic acid which monoesters are the monostearates and monooleates of such polyethylene glycols.

2. A composition as claimed in claim 1, wherein the polyoxyalkylene compound is polyethylene glycol having an average molecular weight between 4000 and 6000.

3. A composition as claimed in claim 1 wherein the polyoxyalkylene compound is a monostearate of a polyethylene glycol having an average molecular weight between 4000 and 6000.

4. A composition as claimed in claim 1, wherein the polyoxyalkylene compound is a monooleate of a polyethylene glycol having an average molecular weight between 4000 and 6000.

5. A composition as claimed in claim 1, wherein the polymerized monovinyl aromatic hydrocarbon is polystyrene.

6. A process for making a polymeric composition of matter which comprises heat-plastifying and mechanically blending from 85 to 97 percent by weight of a normally solid thermoplastic polymer consisting of at least one polymerized monovinyl aromatic hydrocarbon having a single benzene nucleus and a single vinyl radical directly attached to a carbon atom of the benzene nucleus with from 15 to 3 percent by weight of a rubbery copolymer containing in chemically combined form from 70 to 85 percent by weight of butadiene and from 30 to 15 percent of styrene and with from 1 to 5 percent, based on the total weight of the polymeric ingredients, of at least one polyoxyalkylene compound selected from the group consisting of polyethylene glycols having an average molecular weight between 4000 and 6000 and the monoesters of stearic acid and oleic acid which monoesters are the monostearates and monooleates of such polyethylene glycols, at temperatures between 140° and 280° C. until a uniform composition is obtained.

7. A process as claimed in claim 6 wherein the polymerized monovinyl aromatic hydrocarbon is polystyrene.

References Cited in the file of this patent

UNITED STATES PATENTS

| 1,739,315 | Kessler et al. | Dec. 10, 1929 |
| 1,970,578 | Schoeller et al. | Aug. 21, 1934 |
| 2,588,660 | Roche et al. | Mar. 11, 1952 |
| 2,622,044 | Martens | Dec. 16, 1952 |
| 2,643,987 | Harrison et al. | June 30, 1953 |
| 2,752,319 | Lipke et al. | June 26, 1956 |
| 2,863,849 | Fordham | Dec. 9, 1958 |
| 2,912,388 | Leahy et al. | Nov. 10, 1959 |
| 2,958,671 | Keskkula et al. | Nov. 1, 1960 |